United States Patent [19] | [11] 4,067,465
Tsernes et al. | [45] Jan. 10, 1978

[54] UNLOADING STATION OF AN INSTALLATION FOR PNEUMATIC TRANSPORTATION OF GOODS IN A CONTAINERS

[76] Inventors: Vladimir Yakovlevich Tsernes, Kirovogradskaya ulitsa, 24, korpus 3, kv. 204; Alexandr Borisovich Shekhel, Snaiperskaya ulitsa, 5, kv. 161; Leonid Petrovich Kakoshkin, Vadkovsky pereulok, 16, korpus 1, kv. 15, all of, Moscow; Lev Nikolaevich Schukin, prospekt Koroleva 12, kv. 122, Moskovskaya oblast, Kaliningrad; Boris Vladimirovich Sakharov, Ukrainsky bulvar 6, kv. 27, Moscow, all of U.S.S.R.

[21] Appl. No.: 744,741

[22] Filed: Nov. 24, 1976

[51] Int. Cl.² .................... B65G 67/34
[52] U.S. Cl. .................... 214/62 A; 214/64
[58] Field of Search .................... 214/38 R, 58, 62 R, 214/62 A, 64, 44 C, 52 R, 52 C

[56] References Cited

U.S. PATENT DOCUMENTS

| | | | |
|---|---|---|---|
| 2,236,471 | 3/1941 | Eppensteiner | 214/62 A |
| 3,358,858 | 12/1967 | Zabel, Jr. | 214/62 R |
| 3,604,575 | 9/1971 | Jaekle et al. | 214/38 R |

*Primary Examiner*—Albert J. Makay
*Attorney, Agent, or Firm*—Fleit & Jacobson

[57] ABSTRACT

The unloading station is intended for incorporation in installations for pneumatic transportation of goods in containers through a tubeline and includes a frame having mounted thereon a mechanism intended for interaction with a container, to rotate the same for unloading, and guideways for the wheel bogies of the container. The frame is shaped as an arch overlaying the guideways for the wheel bogies of the container and has its own guideways and a profiled cam surface extending about the perimeter of the frame. The container-rotating mechanism comprises a driven trolley accommodated in the guideways of the frame and a member mounted on this driven trolley for reciprocation relative to the latter in a direction transverse of that of reciprocation of the driven trolley, the member having one of its extremities permanently urged into engagement with the profiled cam surface, whereby the latter is adapted to initiate engagement of the other extremity of the member with an element of the container, to maintain the member in this engagement throughout the rotation of the container and to disengage it from said element upon the completion of such rotation. The disclosed unloading station enables to unload both halted and moving containers.

4 Claims, 7 Drawing Figures

1
10
9
17
33
26
23
21
22
24
25
16
27
3
C
8
7
6
30
29
VI
VI
28
35
4a
5
4

UNLOADING STATION OF AN INSTALLATION FOR PNEUMATIC TRANSPORTATION OF GOODS IN A CONTAINERS

The present invention relates to installations for pneumatic transportation of goods in a container through a tube line and, more particularly, it relates to unloading stations incorporable in such installations.

There is known an unloading station in an installation for pneumatic transportation of goods in a container, comprising a frame defining a stationary cylindrical chamber with an unloading or discharge port closable with a cover. Extending through the chamber is a lenth of the tube line providing the guideways for the wheel bogies of the containers. This length likewise has an unloading or discharge port closable with its own cover.

The length of the tube line in this known unloading station is mounted for rotation about its geometric axis, to provide for alignment of the respective ports of the cylindrical chamber and of this length for unloading a container. A container being unloaded is retained in this length of the tube line for joint rotation therewith. The rotation is effected with aid of a mechanism mounted on the cylindrical chamber.

The last-mentioned mechanism includes a fluid-actuated cylinder having its piston rod connected through a rope-and-tackle system with the length of the tubeline, serving as the guideways for the rolling bogies of the container.

The aforementioned unloading station in an installation for pneumatic transportation of goods in containers has in its structure a considerable amount of metal, i.e. the unloading station is relatively heavy, which means that the amount of energy required for rotating the length of the tube line with a container therein is relatively great.

It is an object of the present invention to create an unloading station incorporable in an installation for pneumatic transportation of goods in a container through a tube line, wherein the frame and the mechanism for rotating a container should have a construction enabling to reduce the amount of metal in their structure.

It is another object of the present invention to reduce the amount of energy required for unloading a container.

With these and other objects in view, there is herein disclosed an unloading station incorporable in an installation for pneumatic transportation of goods in a container through a tube line, the container being mounted on its wheel bogies for rotation relative thereto, the station comprising a frame having mounted thereon a mechanism adapted to cooperate with the container to rotate the latter for unloading, and guideways for the wheel bogies of the container, in which station, in accordance with the invention, the frame is shaped as an arch overlying the guideways for the wheel bogies of a container and has its own guideways and a profiled cam surface, both the guideways and the surface extending along the perimeter of the frame and being spaced from one another, the mechanism for rotating the container comprising a driven trolley accommodated in the guideways of the frame and a member mounted on the driven trolley for motion relative thereto in a direction transverse of the reciprocation of the driven trolley, having one of its extremities permanently urged into engagement with the profiled cam surface, whereby the latter is adapted to effect the engagement of the opposite extremity of the member with an element belonging to the container, to maintain this other extremity of the member in engagement with the element of the container during the rotation of the latter and to permit disengagement of this member upon the completion of such rotation.

It is expedient that the profiled cam surface should extend along an arc of a circle over the portion thereof, corresponding to the engagement of the other extremity of said member with said element of the container, the centre of this circle belonging to the geometric axis of the rotation of the container, and that the portions corresponding to the initiation of this engagement and to the termination of this engagement, respectively, should extend tangentially of this arc of the circle.

With the profiled cam surface having this configuration, smooth engagement of the member of the trolley with the element of the container and their smooth disengagement are provided for.

It is further expedient that the frame should be supported by wheels accommodated in guideways extending parallel with the guideways accommodating the wheel bogies of the container.

With the frame mounted on wheels, it becomes possible to unload a container during continuous motion of the latter, which enables to step up the capacity of the installation for pneumatic transportation of goods in a container through a tube line.

It is also expedient that the extremity of the member of the driven trolley of the mechanism for rotating a container, adapted for cooperation with the profiled cam surface of the frame, should have mounted thereon a rotatable follower having its axis of rotation extending parallel with the guideways for the wheel bogies of the container, and that the other extremity of this member should have mounted thereon another rotatable follower having its axis of rotation extending radially of said arc of the circle, defining the portion of the profiled cam surface, corresponding to the engagement of this other extremity of the member with the element of the container.

This arrangement of the followers on the extremities of the member of the driven trolley enables, with the frame being stationary, to rotate the container in the course of the latter's continuous motion.

An unloading station of an installation for pneumatic transportation of goods in a container through a tube line, constructed in accordance with the present invention, while being of a relatively simple structure, requires considerably less metal for its construction than hitherto known similar unloading stations. The operation of an unloading station in accordance with the present invention requires considerably less energy. Furthermore, the herein disclosed unloading station enables to unload containers in the course of their continuous motion, which provides for stepping up the capacity and productivity of the installation for pneumatic transportation of goods in containers through a tube line, as a whole.

Given hereinbelow is a description of embodiments of the present invention, with reference being had to the accompanying set of drawings, wherein.

Figure 1:
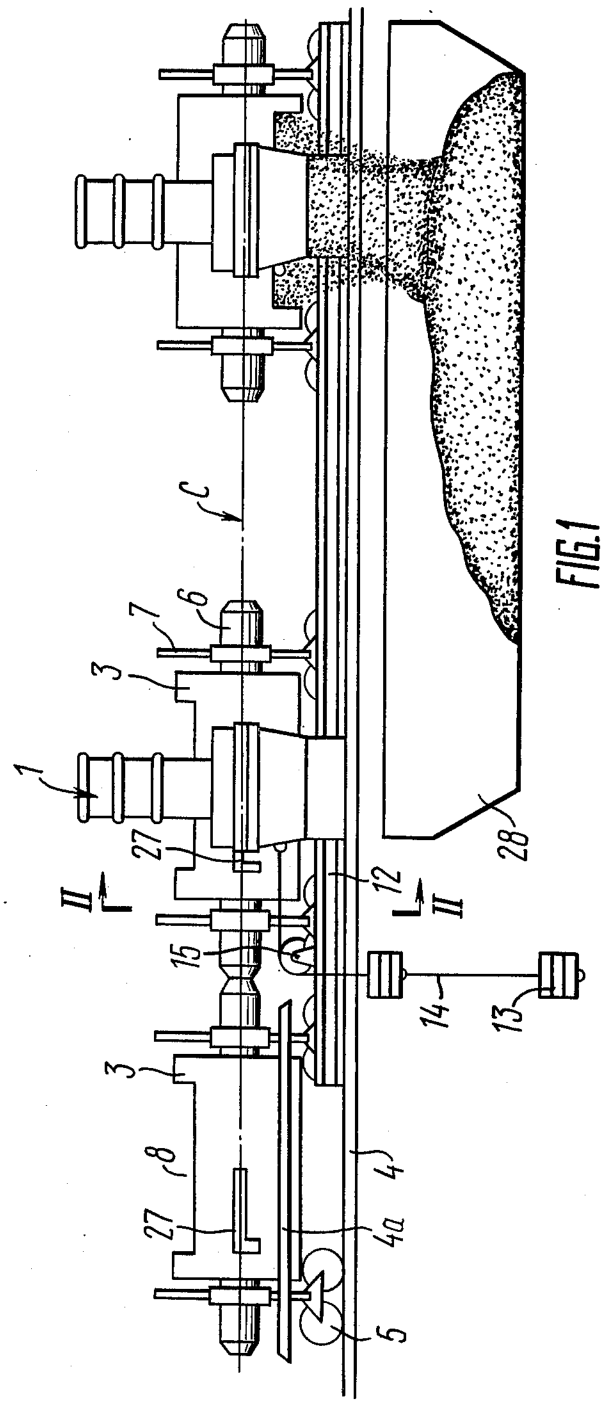
FIG. 1 is a schematic side elevation of an unloading station in accordance with the invention.
Figure 2:
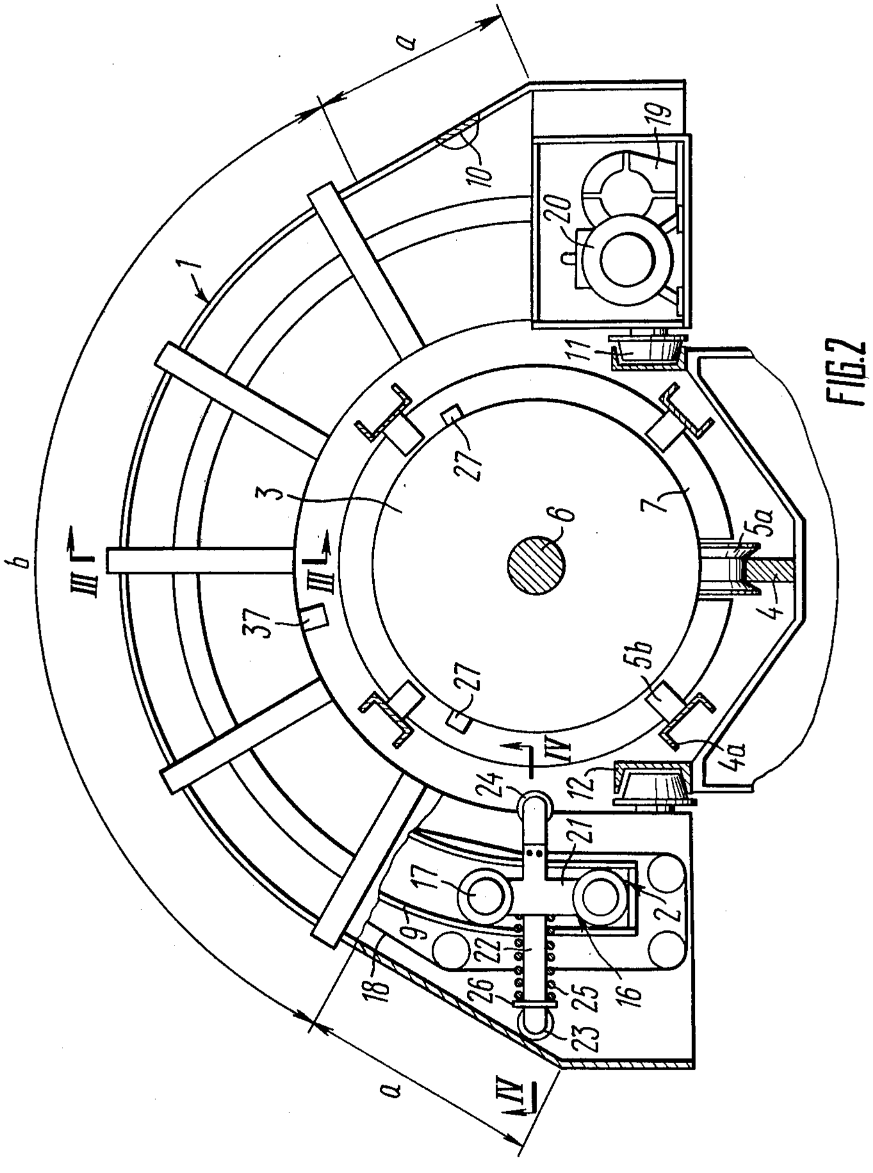
FIG. 2 shows on a larger scale a sectional view taken on line II—II of FIG. 1.

Referring now in particular to the appended drawings, the unloading station comprises a frame 1 (FIGS. 1 and 2) shaped as an arch, a mechanism 2 (FIG. 2) for rotating a container 3 and guideways 4 for the wheel bogies 5 of the container 3. The wheel bogies 5 of the container 3 include support wheels 5*a* and guide wheels 5*b* in engagement, respectively, with guideways 4 and guideways 4*a*. The container 3 has its journals 6 mounted in seals 7 belonging to the structure of the wheel bogies 5, for rotation with respect to these wheel bogies 5. The container 3 has in the top thereof (i.e. the top part in the drawing, FIG. 1) a port 8 through which the container can be loaded with goods and through which the goods can be unloaded or discharged therefrom. The frame 1 in cross-section is rectangular, as it can be seen in FIG. 3. The side walls of the frame 1 have secured theretc guideways 9 (FIG. 2), while the inner surface of the upper wall of the frame 1 defines a profiled cam surface 10. The guideways 9 and the profiled cam surface 10 extend along the perimeter of the frame 1 and are spaced from one another. The frame 1 is supported by wheels 11 (FIG. 2) accommodated in guideways 12 extending parallel with the guideways 4 accommodating the wheel bogies 5 of the container 3. To rotate the frame 1 into its initial position, there is incorporated in the presently disclosed embodiment a counterweight 13 connected to the frame 1 via a flexible cable 14 running over a pulley 15.

However, any other known per se mechanism, suitable for the purpose, can be incorporated to rotate the frame 1 into its initial position.

The mechanism 2 for rotating the container 3 comprises a trolley 16 having its wheels 17 accommodated in the guideways 9 of the frame 1. The trolley 16 is operatively connected via a chain transmission 18 and a reducing gear 19 to an electric motor 20, all the above components being carried by the frame 1. The framework 21 (FIG. 4) of the trolley 16 has mounted thereon a member 22, with rotatable followers 23 and 24 mounted on the opposite extremities or ends thereof. The member 22 is mounted on the framework 21 of the trolley 16 for motion relative thereto in a direction transverse of that of reciprocation of the trolley 16. The member 22 is permanently urged by a compression spring 25, received between the framework 21 and a lug 26 of the member 22, into engagement with the profiled cam surface 10 of the frame 1. The other extremity of the member 22, supporting the follower 24, is engageable with an element 27 provided on the container 3. Two elements 27 are provided on the container 3 symmetrically at both sides of the container, which enables to rotate the latter in either direction.

The portions "*a*" (FIG. 2) of the profiled cam surface 10, arranged symmetrically with respect to the frame 1, are intended for effecting engagement and disengagement of the member 22 and the element 27. The portion "*b*" of the profiled cam surface 10 extends along an arc of a circle having its centre belonging to the geometric axis "*C*" (FIG. 1) of rotation of the container 3. In the present embodiment the extent of this arc is somewhat short of a half-circle. The portion "*b*" is intended to maintain the follower 24 of the member 22 in engagement with the element 27 of the container 3. The portions "*a*" extend tangentially of the circular arc defining the portion "*b*". This structure of the profiled cam surface 10 provides for smooth initiation of the engagement of the member 22 with the element 27 of the container 3, for reliably maintaining this engagement throughout the rotation of the container 3 and for smooth disengagement. A receptacle 28 for the goods unloaded from the container 3 underlies the guideways 4 and 12.

In a modified embodiment of the unloading station the frame 29 (FIGS. 5 and 6) is stationary and is mounted on supports 30, the rest of its structure being identical with that of the frame 1 described hereinabove.

Figures 3, 4, 5:
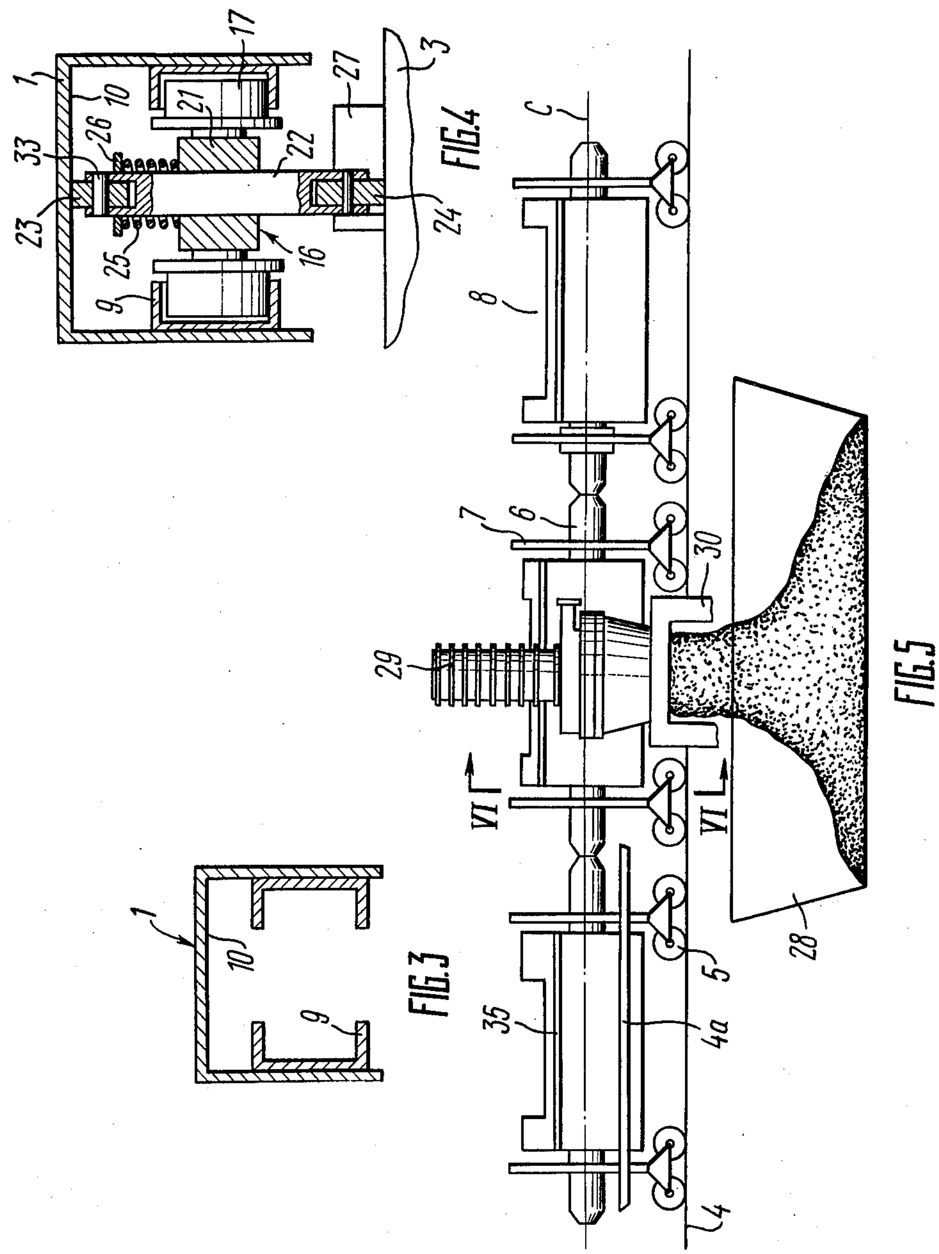
FIG. 3 is a sectional view taken on line III—III of FIG. 2.
FIG. 4 is a sectional view taken on line IV—IV of FIG. 2.
FIG. 5 is a schematic side elevation of another embodiment of an unloading station in accordance with the present invention.

In the container-rotating mechanism 31 the extremity of the member 32 mounted on the trolley 16, intended for cooperation with the profiled cam surface 10, has mounted thereon a rotatable follower similar to the follower 23 (FIG. 4).

The axis of rotation of this follower is similar to axis 33 of follower shown in FIG. 4 and extends parallel with the guideways 4 (FIGS. 5 and 6) for the wheel bogies 5 of the container 3. The opposite extremity of the member 32 has mounted thereon another follower 34 (FIG. 7) adapted to engage an element 35 secured to the container 3. The axis 36 of rotation of the follower 34 extends along a radius of the circular arc defining the portion "*b*" of the profiled cam surface 10. The element 35 extends practically along the entire side surface of the container 3, the actual length of the element 35 being selected to correspond to the rate of rotation of the container 3 at unloading.

With the follower 34 thus mounted on the member 32, it becomes possible to rotate the container 3 in the course of the latter's continuous motion, with the frame 1 being stationary.

The herein disclosed unloading station for an installation for pneumatic transportation of goods in containers through a tube line operates, as follows.

At the initial moment of an unloading sequence the trolley 16 of the container-rotating mechanism is in its extreme left-hand position (in the drawing) relative to the frame 1, the member 22 having its follower 23 urged against the portion "*a*" of the profiled cam surface 10. When the container 3 enters the frame 1 without interrupting its motion, a pickup 37 generates a signal to energize the motor 20. The latter thus becomes operative and drives the trolley 16 through the reducing gear 19 and the chain transmission 18.

The trolley starts its motion along the guideways 9 of the frame 1, while the member 22, following the portion "*a*" of the profiled surface 10 is projected into engagement, via the follower 24, with the element 27 of the container 3. The container 3 and the frame 1 thus being connected through the trolley 16 of the container-rotating mechanism 2, they begin to move jointly as a single whole.

Meanwhile, the trolley 16 continues its motion along the guideways 9 of the frame 1, and the member 22 begins following the portion "*b*" of the profiled surface 10, corresponding to the zone of rotation of the container 3. The container 3 in this zone is rotated toward its toppled-over position, and is unloaded completely by the moment the trolley 16 is driven to the extreme right-hand point of the portion "*b*" of the frame 1, whereafter the member 22 of the trolley 16 follows the respective portion "*a*" of the profiled surface 10 and thus is driven out of the engagement with the element 27 of the container 3. The frame 1 and the container 3 thus become disconnected, the motor 20 is deenergized, and the trolley 16 halts in its extreme right-hand position (in the drawing). The countterweight 13 returns the frame 1 into the latter's initial position, while the container 3 leaves for the successive span of the tube line (not shown).

The elements 27 being provided on the container symmetrically at both sides thereof, the rotation on the successive container to be unloaded is effected in the opposite direction, which steps up still further the efficiency of the unloading operation.

The disclosed structure of the unloading station, as it has been already stated, offers non-stop unloading of containers, which increases the overall efficiency of the installation for pneumatic transportation of goods in containers and enables to have less metal in the structure of the station, as compared with the hitherto known constructions.

Figure 6:
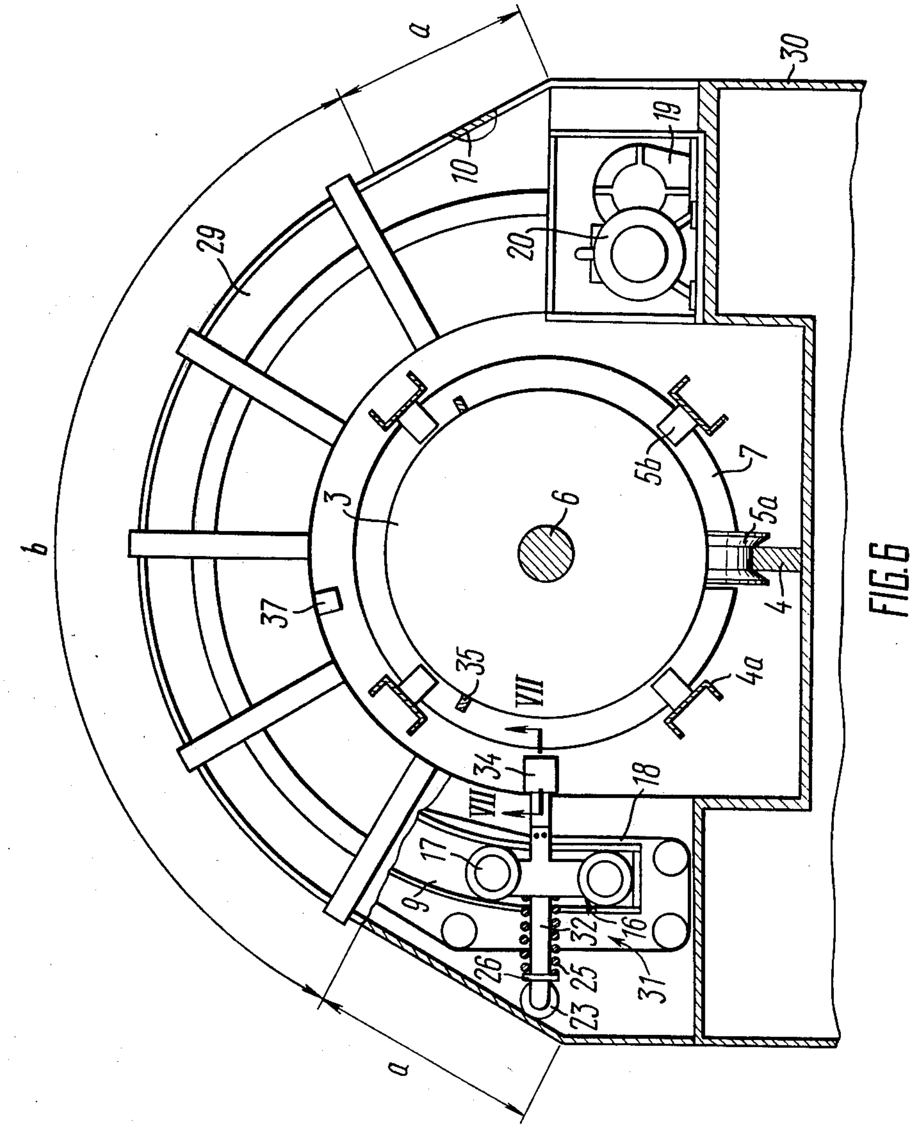
FIG. 6 shows on a larger scale a sectional view taken on line VI—VI of FIG. 5.
Figure 7:
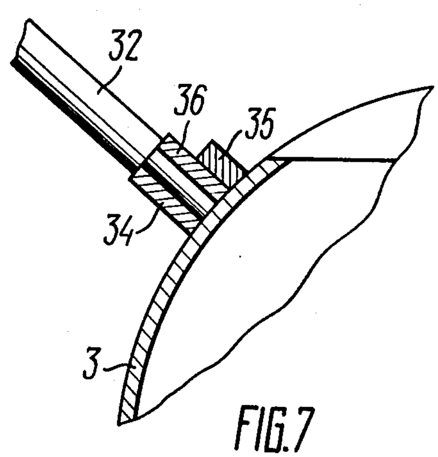
FIG. 7 is a sectional view taken on line VII—VII of FIG. 6.

In the other embodiment of the unloading station, illustrated in FIGS. 5 and 6, the frame 29, as it has been mentioned hereinabove, is stationary on supports 30. While the moving container 3 is rotated in this case, the element 35 extending practically along the entire length of the container 3 effects rotation of the follower 34 of the member 32, this follower 34 being arranged so that its axis 36 of rotation extends radially of the circular arc defining the portion "*b*" of the profiled surface 10. The rest of the features of the operation of the unloading station of this embodiment are similar to those described hereinabove in connection with the first-appearing embodiment.

However, as long as in the last-described embodiment the frame 1 does not have to move jointly with the container 3 being unloaded without interrupting its motion, the dimensions of the unloading station of this embodiment may be reduced still further, and the required amount of energy is likewise reduced.

If and when required, an unloading station of the above-described embodiments is operable for unloading a halted container, without any modifications introduced into its design.

At present, a pilot model of the unloading station has been made in metal and undergoes a series of tests at actual transportation of bulk materials, which have so far proved that it is capable of downtime-free performance at unloading of containers.

What is claimed is:

1. An unloading station for an installation for pneumatic transportation of goods in a container through a tube line, the container being mounted on its wheel bogies for rotation relative thereto, comprising: guideways for the wheel bogies of said container; a frame shaped as an arch, overlying said guideways for the wheel bogies of said container; guideways provided on said frame over the perimeter thereof; a profiled surface provided on said frame over the perimeter thereof, spaced from said guideways of said frame; a mechanism for rotating said container, including: a driven trolley accommodated in said guideways of said frame, a member mounted on said driven trolley for motion relative thereto in a direction transverse of that of the motion of said trolley, having one of its extremities permanently urged toward said profiled surface, the latter being adapted to initiate the engagement of the other extremity of said member with an element provided on said container, to maintain this other extremity of said member in the engagement with the element of said container in the course of the latter being rotated, and to terminate this engagement, following the completion of the rotation of said container, said initiating, maintaining and terminating of engagement of the other extremity of said member with the element of said container occurring during the movement of said trolley in one direction along said guideways in said frame; and means for driving said driven trolley.

2. An unloading station as set forth in claim 1, wherein said profiled surface over the portion thereof,-corresponding to the engagement of the other extremity of said member with the element of said container, extends along an arc of a circle of which the centre belongs to the geometric axis of the rotation of said container, the portions corresponding to the initiation and termination of this engagement extending tangentially of this arc of the circle.

3. An unloading station as set forth in claim 1, wherein said frame is supported by wheels accommodated in guideways extending parallel with the guideways for the wheel bogies of said container.

4. An unloading station for an installation for pneumatic transportation of goods in a container through a tube line, the container being mounted on its wheel bogies for rotation relative thereto, comprising: guideways for the wheel bogies of said container; a frame shaped as an arch, overlying said guideways for the wheel bogies of said container; guideways provided on said frame over the perimeter thereof; a profiled surface provided on said frame over the perimeter thereof, spaced from said guideways of said frame; a mechanism for rotating said container, including: a driven trolley accommodated in said guideways of said frame, a member mounted on said driven trolley for motion relative thereto in a direction transverse of that of the motion of said driven trolley, having one of its extremities permanently urged toward said profiled surface, the latter being adapted to initiate the engagement of the other extremity of said member with an element provided on said container, to maintain this other extremity of said member in the engagement with this element of said container in the course of the latter being rotated, and to terminate this engagement, following the completion of the rotation of said container, said profiled surface, over the portion thereof corresponding to the engagement of the other extremity of said member with the element of said container, extending along an arc of a circle having its centre belonging to the geometric axis of the rotation of said container, the portions of said surface, corresponding to the initiation and termination of this engagement, extending tangentially of this arc of the circle; a follower mounted on the extremity of said member, adapted for cooperation with said profiled surface, for rotation about an axis extending parallel with said guideways for the wheel bogies of said container; another follower mounted on the other extremity of said member for rotation about an axis extending along a radius of the arc of the circle, defining the portion of said profiled surface, corresponding to the engagement of the other extremity of said member with the element of said container; means for driving said driven trolley.

* * * * *